(12) United States Patent
Yoshioka et al.

(10) Patent No.: US 12,289,268 B2
(45) Date of Patent: Apr. 29, 2025

(54) COMMUNICATION APPARATUS AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Huan Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 114 days.

(21) Appl. No.: 17/598,511

(22) PCT Filed: Apr. 2, 2019

(86) PCT No.: PCT/JP2019/014710
§ 371 (c)(1),
(2) Date: Sep. 27, 2021

(87) PCT Pub. No.: WO2020/202482
PCT Pub. Date: Oct. 8, 2020

(65) Prior Publication Data
US 2022/0150023 A1    May 12, 2022

(51) Int. Cl.
*H04L 5/00* (2006.01)
(52) U.S. Cl.
CPC ................. *H04L 5/0051* (2013.01)
(58) Field of Classification Search
None
See application file for complete search history.

(56) References Cited

U.S. PATENT DOCUMENTS

| 2021/0250912 | A1* | 8/2021 | Yoon | H04W 76/14 |
|---|---|---|---|---|
| 2021/0266868 | A1* | 8/2021 | Shin | H04W 72/02 |
| 2022/0061041 | A1* | 2/2022 | Chen | H04L 5/0048 |
| 2022/0159590 | A1* | 5/2022 | Lee | H04W 4/40 |

OTHER PUBLICATIONS

ITL, "Physical Layer Structure for NR V2X", 3GPP TSG RAN WG1 #96bis, R1-1905099, pp. 1-9 (Year: 2019).*
Huawei, HiSilicon, "Reference signal design for sidelink control and data channel", Feb. 25-Mar. 1, 2019, 3GPP TSG RAN WG1 Meeting #96, R1-1901538, pp. 1-8 (Year: 2019).*
International Search Report issued in PCT/JP2019/014710 on Jun. 11, 2019 (5 pages).
Written Opinion of the International Searching Authority issued in PCT/JP2019/014710 on Jun. 11, 2019 (4 pages).
ITL; "Physical layer structure for NR V2X"; 3GPP TSG RAN WG1 #96bis, R1-1905099; Xi'an, China; Apr. 8-12, 2019 (9 pages).

(Continued)

*Primary Examiner* — Steve R Young
(74) *Attorney, Agent, or Firm* — Osha Bergman Watanabe & Burton LLP

(57) ABSTRACT

A communication apparatus includes a control unit configured to, when a sidelink control channel and a sidelink shared channel are to be frequency-division multiplexed, map a demodulation reference signal for the sidelink shared channel onto a symbol onto which a demodulation reference signal for the sidelink control channel is mapped; and a transmitting unit configured to transmit the symbol onto which the demodulation reference signal for the sidelink control channel and the demodulation reference signal for the sidelink shared channel are mapped.

4 Claims, 14 Drawing Sheets

(56) References Cited

OTHER PUBLICATIONS

OPPO; "Text proposal to support 64-QAM in eV2X"; 3GPP TSG RAN WG1 Meeting #94, R1-1808873; Gothenburg, Sweden; Aug. 20-24, 2018 (3 pages).
3GPP TS 38.213 V15.4.0; "3rd Generation Partnership Project; Technical Specification Group Radio Access Network; NR; Physical layer procedures for control (Release 15)"; Dec. 2018 (104 pages).
3GPP TS 38.211 V15.4.0; "3rd Generation Partnership Project; Technical Specification Group Radio Access Network; NR; Physical channels and modulation (Release 15)"; Dec. 2018 (96 pages).
Extended European Search Report in counterpart European Application No. 19923384.2 issued Oct. 7, 2022 (16 pages).
InterDigital Inc.; "On Physical Layer Structure Design"; 3GPP TSG RAN WG1 Meeting #95, R1-1813226; Spokane, USA; Nov. 12-16, 2018 (7 pages).
Office Action issued in counterpart Japanese Patent Application No. 2021-511842 mailed on Apr. 4, 2023 (7 pages).
Huawei; "Reference signal design for sidelink control and data channel"; 3GPP TSG RAN WG1 Meeting #96, R1-1901538; Athens, Greece; Feb. 25-Mar. 1, 2019 (8 pages).
Office Action issued in counterpart Japanese Patent Application No. 2021-511842 mailed on Jun. 20, 2023 (5 pages).
Office Action issued in counterpart Chinese Patent Application No. 201980094632.X mailed on Jun. 29, 2023 (17 pages).

\* cited by examiner

SELECT RADIO RESOURCE FROM SYNCHRONIZED COMMON TIME AND FREQUENCY GRID

FIG.13
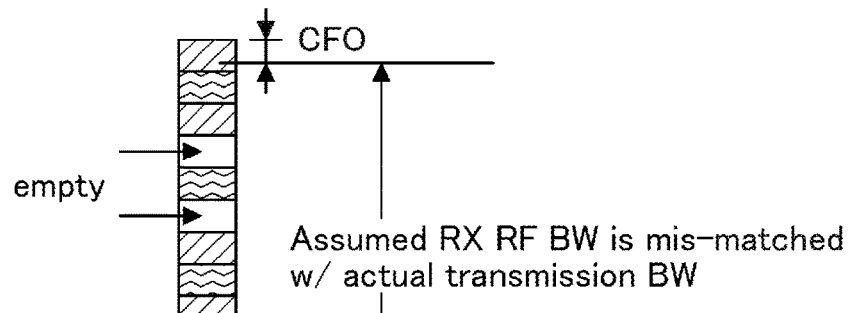
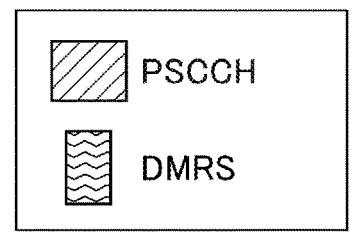
FIG.14
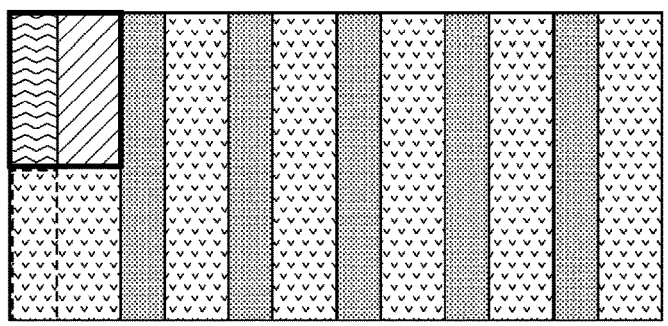
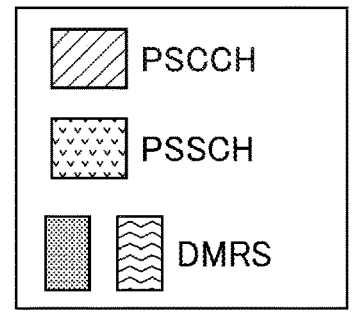

COMMUNICATION APPARATUS AND COMMUNICATION METHOD

TECHNICAL FIELD

The present invention relates to a communication apparatus and a communication method in a radio communication system.

BACKGROUND ART

In Long Term Evolution (LTE), successor systems of LTE (for example, LTE Advanced (LTE-A), and New Radio (NR) (also called 5G)), technology of sidelink (device to device (D2D)) has been studied in which communication apparatuses, such as a user equipment (UE), perform communication directly with each other without going through a base station (Non-Patent Document 1).

Furthermore, implementation of vehicle to everything (V2X) has been studied, and a specification has been developed. Here, V2X is a part of intelligent transport systems (ITS) and is a generic term of vehicle to vehicle (V2V) meaning a communication mode performed between vehicles, vehicle to infrastructure (V2I) meaning a communication mode performed between a vehicle and a road-side unit (RSU) installed on a road side, vehicle to nomadic device (V2N) meaning a communication mode performed between a vehicle and a mobile terminal of a driver, and vehicle to pedestrian (V2P) meaning a communication mode performed between a vehicle and a mobile terminal of a pedestrian as illustrated in FIG. 1.

RELATED ART DOCUMENT

Non-Patent Document

Non-Patent Document 1: 3GPP TS 38.213 V15.4.0 (2018-12)
Non-Patent Document 2: 3GPP TS 38.211 V15.4.0 (2018-12)

SUMMARY OF THE INVENTION

Problem to be Solved by the Invention

At the 3GPP RAN1 meeting of 3GPP, multiplexing of Physical Sidelink Control Channel (PSCCH)/Physical Sidelink Shared Channel (PSSCH) in NR V2X sidelink is being studied. The following Options are considered with regard to multiplexing of PSCCH and PSCCH.

Option 1: PSCCH and an associated PSSCH are transmitted on non-overlapping time resources.

Option 1A: The frequency resources used for the two channels are the same.

Option 1B: The frequency resources used for the two channels are different.

Option 2: PSCCH and an associated PSSCH are transmitted on non-overlapping frequency resources in all the time resources used for transmission.

Option 3: A part of PSCCH and an associated PSSCH are transmitted by using overlapping time resources in non-overlapping frequency resources, but another part of the associated PSCCH and/or another part of the PSCCH are transmitted on non-overlapping time resources.

Among these Options, it is expected to support at least Option 3. In this case, it is desired to clarify a configuration of a demodulation reference signal (DMRS: Demodulation Reference Signal) in PSCCH and PSSCH.

Means for Solving the Problem

According to an aspect of the present invention, there is provided a communication apparatus including a control unit configured to, when a sidelink control channel and a sidelink shared channel are to be frequency-division multiplexed, map a demodulation reference signal for the sidelink shared channel onto a symbol onto which a demodulation reference signal for the sidelink control channel is mapped, and a transmitting unit configured to transmit the symbol onto which the demodulation reference signal for the sidelink control channel and the demodulation reference signal for the sidelink shared channel are mapped.

Advantage of the Invention

According to an embodiment, a configuration of DMRS for PSCCH and PSSCH is clarified.

BRIEF DESCRIPTION OF DRAWINGS

FIG. 13 is a diagram illustrating an example in which DMRS for PSCCH and SCI are frequency-division-multiplexed;
FIG. 14 is a diagram illustrating an example in which sidelink data is mapped onto a symbol that overlaps PSCCH.

EMBODIMENTS OF THE INVENTION

Hereinafter, embodiments of the present invention are described with reference to the appended drawings. The embodiments described below are an example, and embodiments to which the present invention is applied are not limited to the following embodiments.

In the embodiments, it is assumed that a direct communication scheme between communication apparatuses is sidelink (SL) of LTE or NR, but the direct communication scheme is not limited to this scheme. Furthermore, the name "sidelink" is an example, and uplink (UL) may include a function of SL without using the name "sidelink." The SL may be distinguished from downlink (DL) or UL by a difference in a frequency or time resource or may be another name.

Furthermore, UL and SL may be distinguished by a difference of one or more combinations of a time resource, a frequency resource, a time and frequency resource, a reference signal to be referred to so as to determine a path loss in transmission power control, and a reference signals (PSS/SSS/PSSS/SSSS) used for synchronization.

For example, in UL, a reference signal of an antenna port X is used as the reference signal to be referred to so as to determine the path loss in the transmission power control, and in SL (including UL used as SL), a reference signal of an antenna port Y is used as the reference signal to be referred to so as to determine the path loss in the transmission power control.

Furthermore, in the embodiments, a configuration in which a communication apparatus is installed in a vehicle is mainly assumed, but an embodiment of the present invention is not limited to this configuration. For example, a communication apparatus may be a terminal carried by a person, a communication apparatus may be a drone or a device installed in an aircraft, and a communication apparatus may be a base station, an RSU, a relay station (relay node), a user equipment provided with scheduling capability, or the like.

(Overview of Sidelink)

In the embodiment, since sidelink is a basic technique used here, first, an overview of sidelink is described as a basic example. An example of a technique described here is a technique specified in Rel. 14 of 3GPP or the like. This technique may be used in NR, or a technique different from this technique may be used in NR. A sidelink communication may be defined to be a direct communication performed among two or more neighboring units of user equipment by using E-UTRA technology, without going through a network node. A sidelink may be defined to be an interface between units of user equipment in a sidelink communication.

Figure 1:
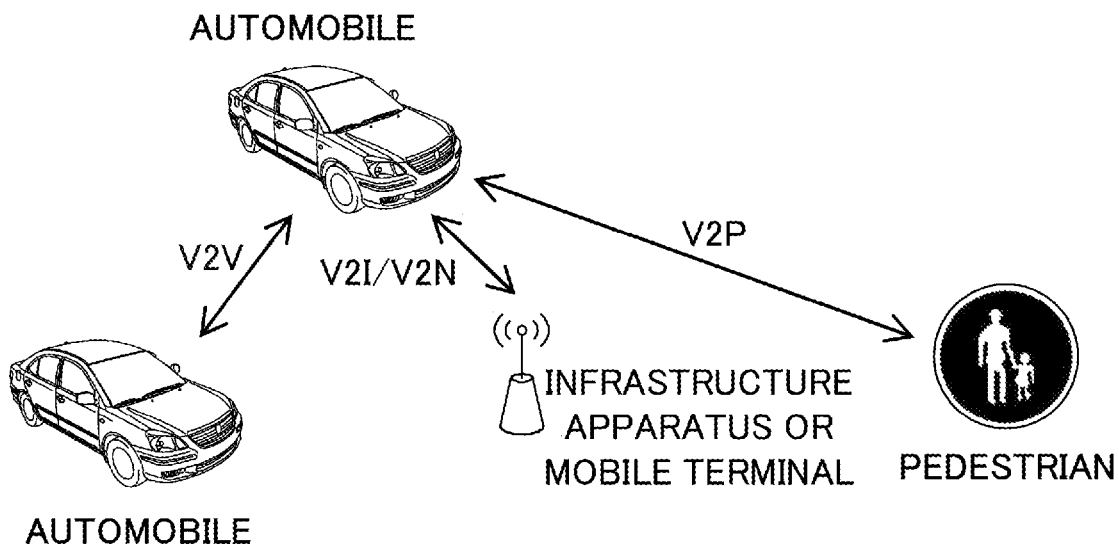
FIG. 1 is a diagram for illustrating V2X.
Figure 2A:
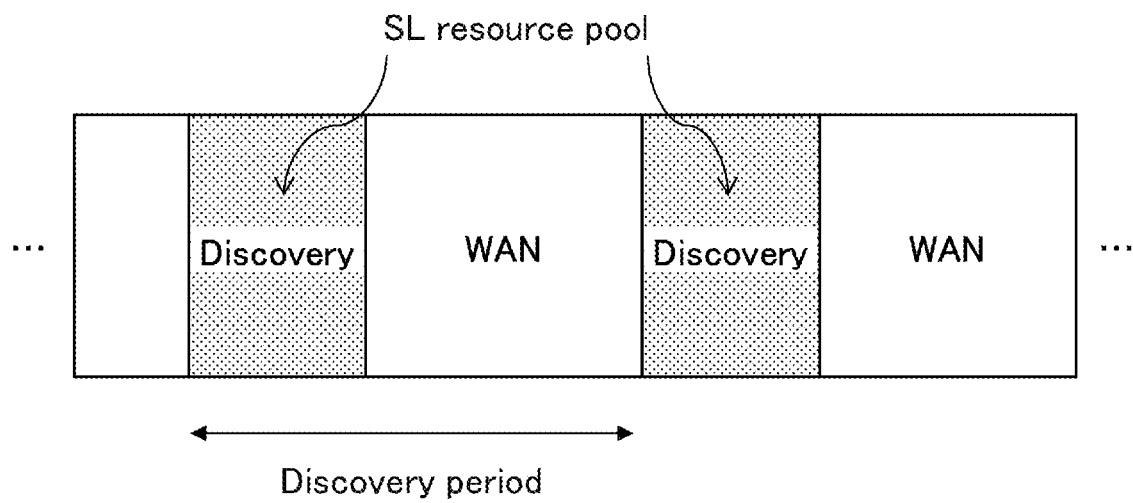
FIG. 2A is a diagram for illustrating sidelink.

Sidelink is roughly divided into "discovery" and "communication." For "discovery," as illustrated in FIG. 2A, a discovery message resource pool is configured for each discovery period, and a communication apparatus (referred to as a UE) transmits a discovery message (discovery signal) within the resource pool. More specifically, there are Type 1 and Type 2b. In Type 1, a communication apparatus autonomously selects a transmission resource from the resource pool. In Type 2b, a quasi-static resource is allocated by higher layer signaling (for example, an RRC signal).

Figure 2B:
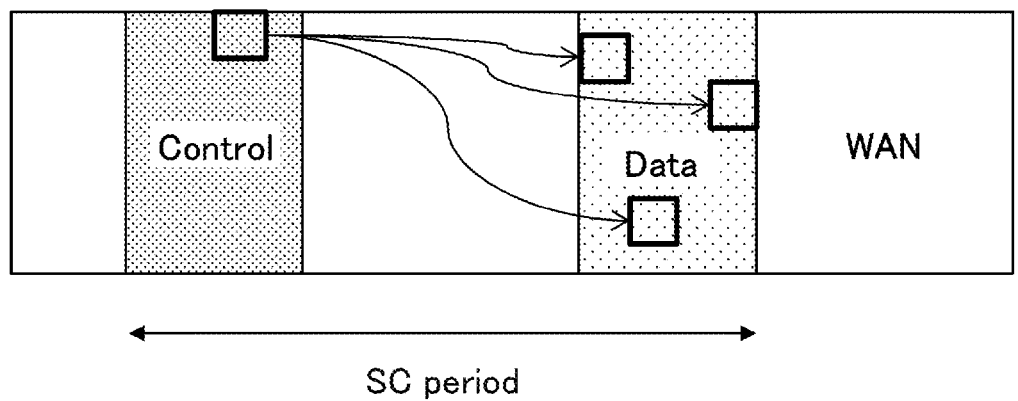
FIG. 2B is a diagram for illustrating sidelink.

For "communication," as illustrated in FIG. 2B, a sidelink control information (SCI)/data transmission resource pool is periodically configured. A communication apparatus on a transmission side notifies a reception side of a data transmission resource (PSSCH resource pool) or the like through the SCI with the resource selected from the control resource pool (PSCCH resource pool), and transmits data with the data transmission resource. For "communication," in further detail, there are a mode 1 and a mode 2. In the mode 1, resources are dynamically allocated by an (enhanced) physical downlink control channel ((E) PDCCH) transmitted from a base station to a communication apparatus. In the mode 2, a communication apparatus autonomously selects a transmission resource from the resource pool. For example, the resource pool is provided by notification through SIB, for example, and is predefined.

In Rel-14, in addition to the mode 1 and the mode 2, there are a mode 3 and a mode 4. In Rel-14, SCI and data can be transmitted simultaneously (in one sub frame) with resource blocks that are adjacent in a frequency direction. The SCI is also referred to as scheduling assignment (SA).

A channel used for "discovery" is referred to as a physical sidelink discovery channel (PSDCH), a channel for transmitting control information such as the SCI in "communication" is referred to as a physical sidelink control channel (PSCCH), and a channel for transmitting data is referred to as a physical sidelink shared channel (PSSCH). The PSCCH and the PSSCH have a PUSCH-based structure and have a structure in which a demodulation reference signal (DMRS) is inserted.

Figure 3:
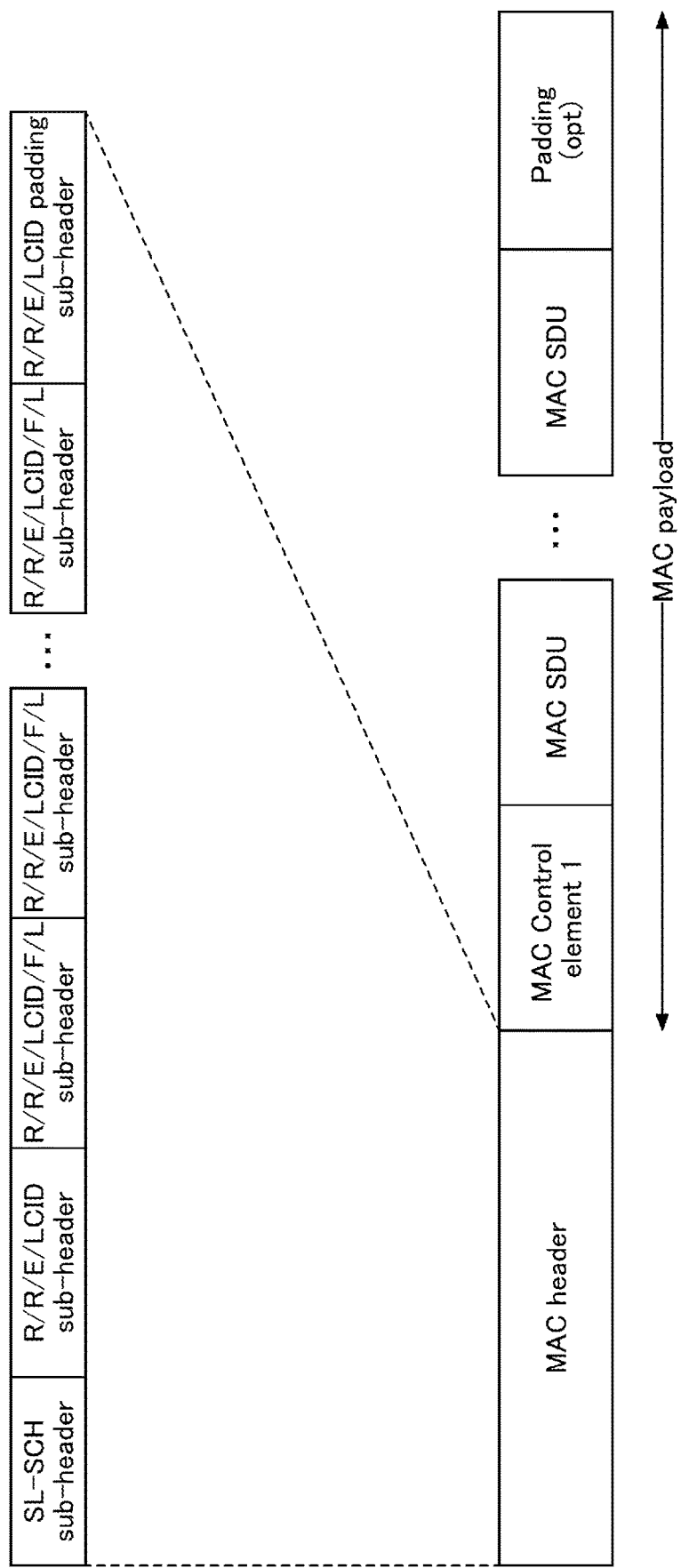
FIG. 3 is a diagram for illustrating a MAC PDU used for sidelink communication.

As illustrated in FIG. 3, a medium access control (MAC) protocol data unit (PDU) used for sidelink includes at least a MAC header, a MAC control element, a MAC service data unit (SDU), and padding. The MAC PDU may include other information. The MAC header includes one a sidelink shared channel (SL-SCH) subheader and one or more MAC PDU subheaders.

Figure 4:
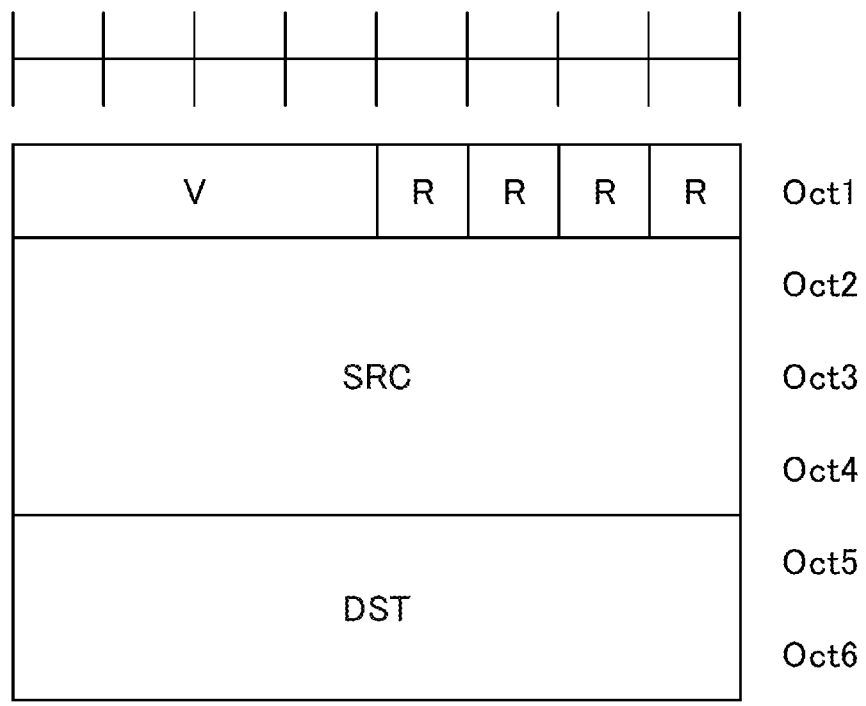
FIG. 4 is a diagram for illustrating a format of an SL-SCH subheader.

As illustrated in FIG. 4, the SL-SCH subheader includes a MAC PDU format version (V), transmission source information (SRC), transmission destination information (DST), reserved bits (R), and the like. V is allocated to the head of the SL-SCH subheader and indicates the MAC PDU format version used by the communication apparatus. Information related to a transmission source is configured in the transmission source information. An identifier related to a ProSe UE ID may be configured in the transmission source information. Information related to a transmission destination is configured in the transmission destination information. Information related to a ProSe Layer-2 Group ID of the transmission destination may be configured in the transmission destination information.

Figure 5:
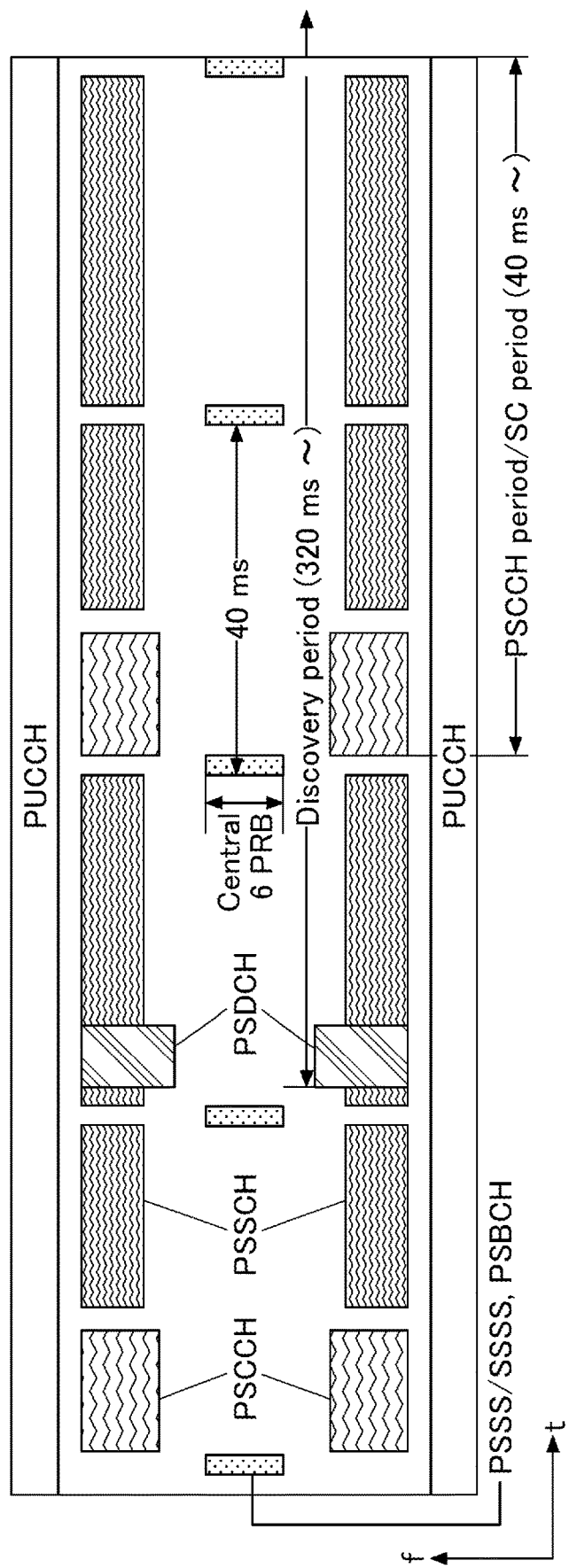
FIG. 5 is a diagram for illustrating an example of a channel structure used in LTE-V2X sidelink.

An example of a channel structure of LTE-V2X sidelink is illustrated in FIG. 5. As illustrated in FIG. 5, the resource pool of the PSCCH used for "communication" and the resource pool of the PSSCH are allocated. Furthermore, the resource pool of the PSDCH used for "discovery" is allocated at a period longer than a period of a channel of "communication." Note that the PSDCH need not be included for NR-V2X.

A Primary Sidelink Synchronization signal (PSSS) and a secondary sidelink synchronization signal (SSSS) are used as synchronization signals for sidelink. For example, a physical sidelink broadcast channel (PSBCH) for transmitting broadcast information such as a system band of sidelink, a frame number, and resource configuration information is used for an operation outside a coverage. The PSSS/SSSS and the PSBCH are transmitted, for example, in one sub frame. The PSSS/SSSS is also referred to as an SLSS.

V2X assumed in the embodiments is a scheme related to "communication." However, in the embodiments, there may be no distinction between "communication" and "discovery." Furthermore, the technology according to the embodiments may be applied in "discovery."

(System Configuration)

Figure 6:
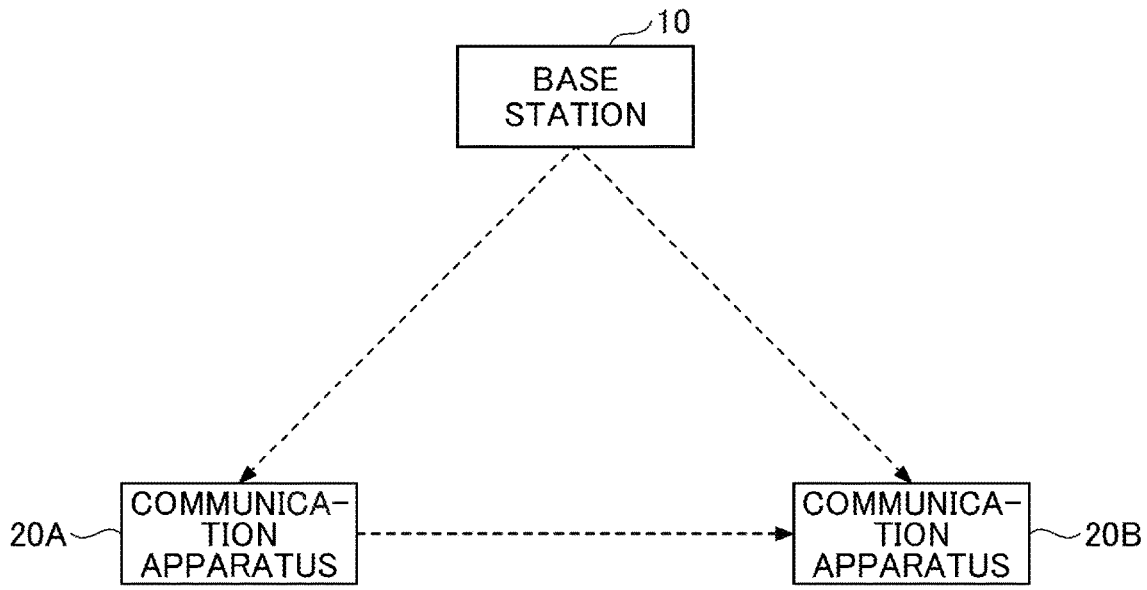
FIG. 6 is a diagram illustrating an example of a configuration of a radio communication system according to an embodiment.

FIG. 6 is a diagram illustrating a configuration example of a radio communication system according to the embodiments. As illustrated in FIG. 6, the radio communication system according to the embodiments includes a base station 10, a communication apparatus 20A, and a communication apparatus 20B. Note that, actually, there may be many communication apparatuses, but FIG. 6 illustrates the communication apparatus 20A and the communication apparatus 20B as an example.

In FIG. 6, it is intended that the communication apparatus 20A is the transmission side, the communication apparatus 20B is the reception side, but both the communication apparatus 20A and the communication apparatus 20B have both the transmission function and the reception function. Hereinafter, when it is not necessary to particularly distinguish the communication apparatuses 20A and 20B, they are referred to simply as a "communication apparatus 20" or a "communication apparatus." FIG. 6 illustrates a case in which the communication apparatus 20A and the communication apparatus 20B are both in the coverage as an example, but an operation according to the embodiments can be applied to a case in which all the communication apparatuses 20 are within the coverage, a case in which some communication apparatuses 20 are within the coverage, and the other communication apparatuses 20 are outside the coverage, and a case in which all the communication apparatuses 20 are outside the coverage.

In the embodiments, the communication apparatus 20 is a device installed in a vehicle such as, for example, an automobile and has a cellular communication function as a UE in LTE or NR and a sidelink function. Furthermore, the communication apparatus 20 has a function of acquiring report information (position, event information, or the like) as in a GPS device, a camera, or various types of sensors. Furthermore, the communication apparatus 20 may be a general mobile terminal (such as a smartphone). Furthermore, the communication apparatus 20 may be an RSU. The RSU may be a UE type RSU having a function of a UE, a BS type RSU (which is also referred to as a gNB type UE) having a function of a base station, or a relay station.

The communication apparatus 20 need not be a device of one housing, and for example, even when various types of sensors are distributed and arranged in a vehicle, a device including various types of sensors is the communication apparatus 20. Furthermore, the communication apparatus 20 may have a function of performing transmission and reception of data with various types of sensors without including various types of sensors.

Furthermore, processing content of sidelink transmission of the communication apparatus 20 is basically similar to processing content of UL transmission in LTE or NR. For example, the communication apparatus 20 scrambles and modulates codewords of transmission data, generates complex-valued symbols, maps the complex-valued symbols (transmission signals) to one or two layers, and performs precoding. Then, the precoded complex-valued symbols are mapped to resource elements, and a transmission signal (for example, CP-OFDM or a DFT-s-OFDM) is generated and transmitted from each antenna port.

The base station 10 has a cellular communication function as a base station 10 in LTE or NR and a function (for example, resource pool configuring, resource allocation, and the like) for enabling communication of the communication apparatus 20 in the embodiments. Furthermore, the base station 10 may be an RSU (a gNB type RSU), a relay station, or a communication apparatus provided with a scheduling function.

Furthermore, in the radio communication system according to the embodiments, a signal waveform used for SL or UL by the communication apparatus 20 may be an OFDMA, an SC-FDMA, or any other signal waveform. Furthermore, in the radio communication system according to the embodiments, as an example, a frame including a plurality of sub frames (for example, 10 sub frames) is formed in a time direction, and it includes a plurality of subcarriers in a frequency direction. One sub frame is an example of one transmission time interval (TTI). Here, the TTI is not necessarily a sub frame. For example, the TTI may be a slot, a mini-slot, or any other unit in the time domain. Furthermore, the number of slots per sub frame may be determined in accordance with the subcarrier spacing. Furthermore, the number of symbols per slot may be 14 symbols.

In the embodiments, the communication apparatus 20 can operate in any mode among a mode 1 which is a mode in which resources are dynamically allocated by the ((enhanced) physical downlink control channel ((E) PDCCH) transmitted from the base station 10 to the communication apparatus, a mode 2 which is a mode in which the communication apparatus autonomously selects a transmission resource from a resource pool, a mode in which resource for SL signal transmission is allocated from the base station 10 (hereinafter referred to as a mode 3), and a mode in which a resource for SL signal transmission is autonomously selected (hereinafter referred to as a mode 4). The mode is configured, for example, in the communication apparatus 20 from the base station 10.

Figure 7:
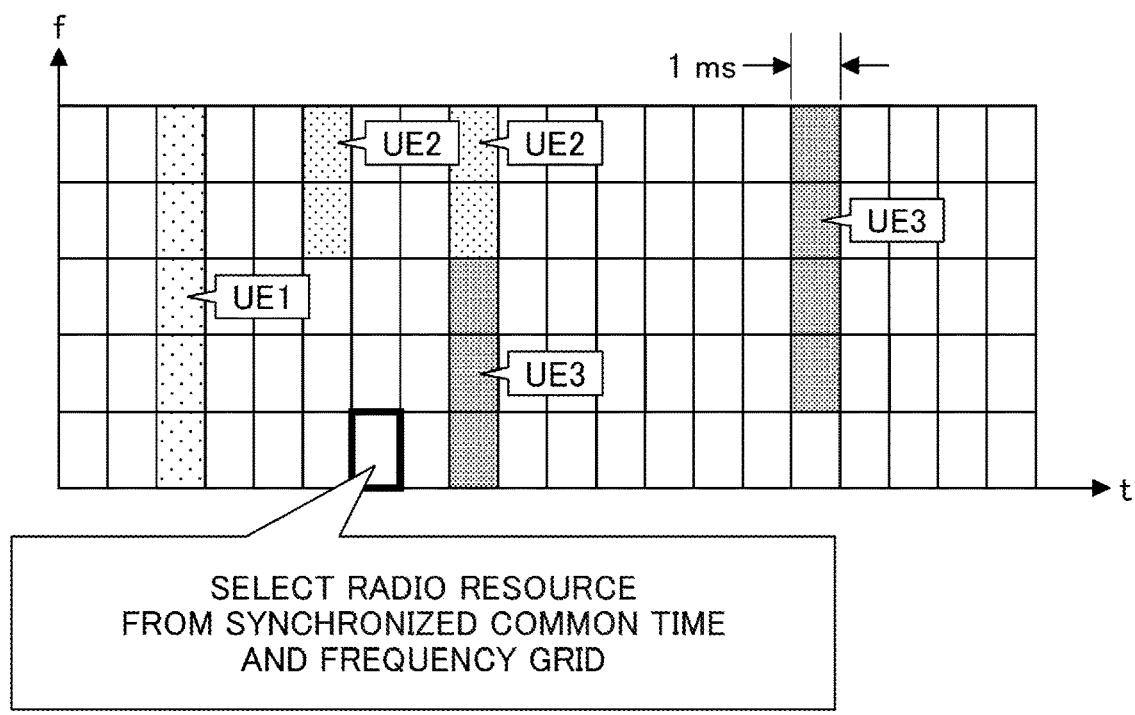
FIG. 7 is a diagram for illustrating a resource selection operation by a communication apparatus.

As illustrated in FIG. 7, the communication apparatus of the mode 4 (indicated by a UE in FIG. 7) selects a radio resource from a synchronized common time and frequency grid. For example, the communication apparatus 20 performs sensing in the background, specifies resources which have a good sensing result and are not reserved for other communication apparatuses as candidate resources, and selects a resource to be used for transmission from the candidate resources.

Figure 8:
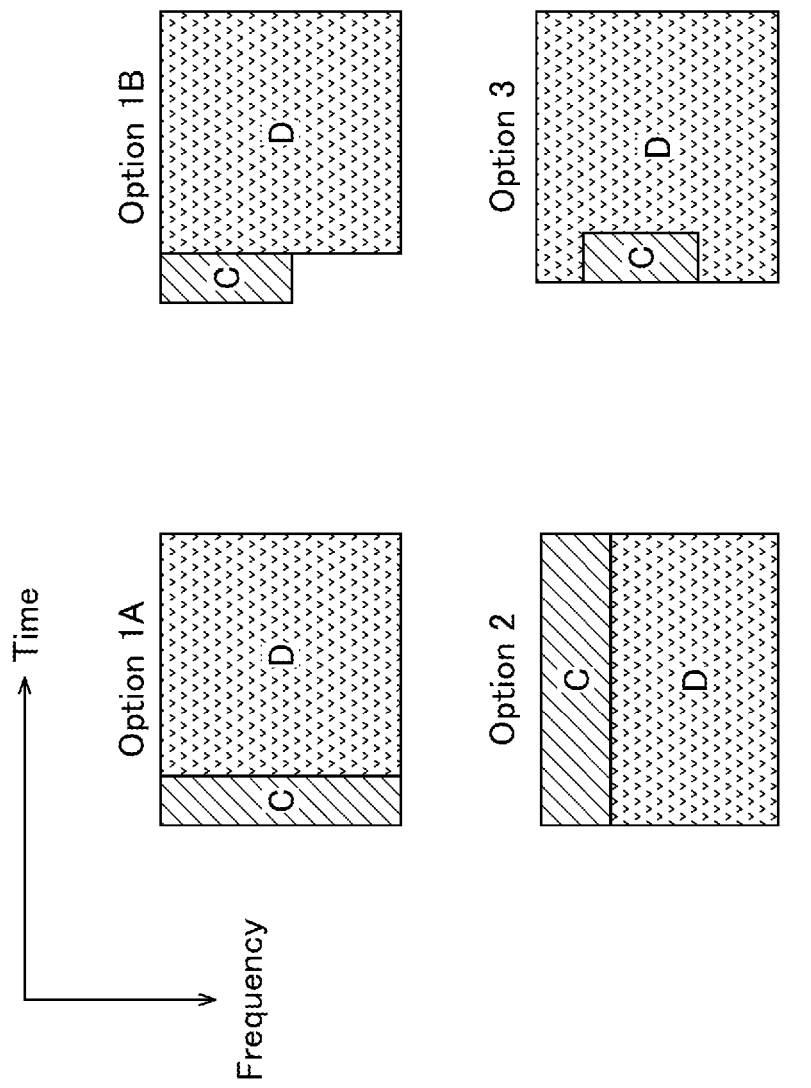
FIG. 8 is a diagram illustrating an example of an option for multiplexing PSCCH with PSSCH.

At the 3GPP RAN1 meeting, multiplexing of Physical Sidelink Control Channel (PSCCH)/Physical Sidelink Shared Channel (PSSCH) in NR V2X sidelink is being studied. As illustrated in FIG. 8, the following Options are considered with regard to multiplexing of PSCCH and PSCCH.

Option 1: PSCCH and an associated PSSCH are transmitted on non-overlapping time resources.

Option 1A: The frequency resources used for the two channels are the same.

Option 1B: The frequency resources used for the two channels are different.

Option 2: PSCCH and an associated PSSCH are transmitted on non-overlapping frequency resources on all the time resources used for transmission.

Option 3: A part of PSCCH and an associated PSSCH are transmitted on overlapping time resources in non-overlapping frequency resources, but another part of the associated PSCCH and/or another part of the PSCCH are transmitted on non-overlapping time resources.

(DMRS)

It is assumed that the demodulation reference signal (DMRS) configuration of NR-V2X is designed based on a configuration of the DMRS of NR Uu (an interface between a user equipment and a base station) of 3GPP Release 15. With regard to PSSCH, multiple DMRS patterns in the time domain are supported. These different DMRS patterns in the time domain are intended to support the different moving speeds of the communication apparatus 20. For faster movement of the communication apparatus 20, it is considered to include many DMRSs in the time domain.

(Problem)

At least for the multiplexing of PSCCH/PSSCH in Option 3 described above, the configuration of DMRS has not been determined yet.

Figure 9:
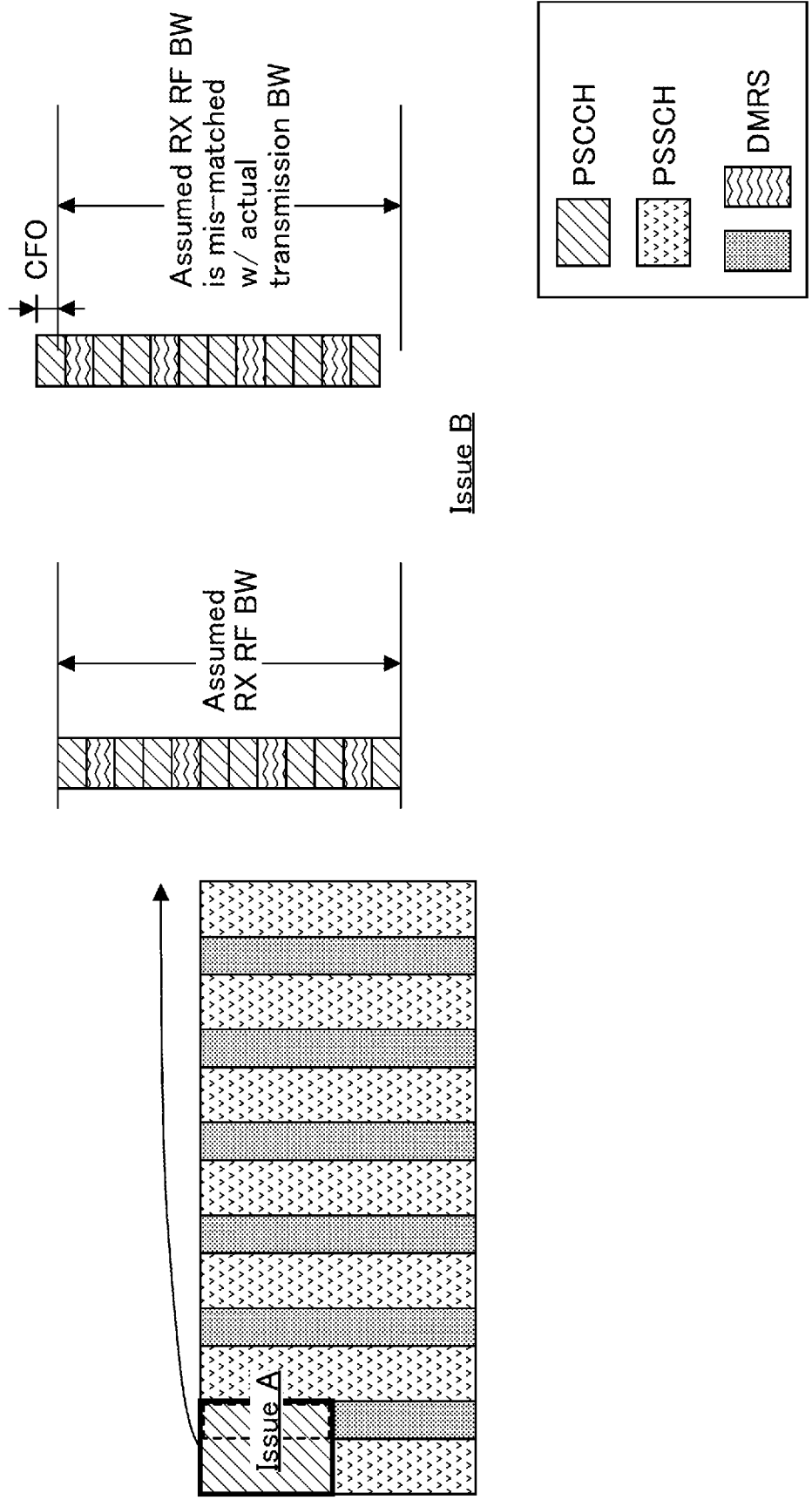
FIG. 9 is a diagram exemplifying a problem.

FIG. 9 is a diagram exemplifying problem A and problem B.

(Problem A)

As illustrated in the figure on the left side of FIG. 9, in a case where PSSCH includes many DMRSs in the time domain, a part of a DMRS may overlap PSCCH. There is a need for a method for processing such an overlapping portion. Namely, it is assumed that power of a DMRS for PSSCH in a portion overlapping a PSCCH is different from power of the DMRS for PSSCH in another symbol. In this manner, in a case where the power of the DMRS for PSSCH is different, channel estimation and the like in a communication apparatus 20 may be affected. It is assumed that a sequence length of the DMRS for the PSSCH in a portion overlapping the PSCCH is different from a sequence length of DMRS for the PSSCH in another symbol. In this manner, it is desired to adopt the configuration of the DMRS in view of the sequence length of the DMRS of the PSSCH. In the present invention, "overlap" may mean overlapping in the time domain.

(Problem B)

In a case where a DMRS pattern for a PSCCH is the same as a DMRS pattern for a Physical Downlink Control Channel (PDCCH) of Release 15 of NR, an offset of a carrier frequency will cause a problem. That is, control information that is frequency-division-multiplexed with the DMRS may interfere with the DMRS. For example, suppose that the PSCCH and the DMRS for the PSCCH are frequency-division-multiplexed as illustrated in the drawing at the center of FIG. 9. In this case, suppose that a slight shift in frequency occurs between the transmitting communication apparatus 20 and the receiving communication apparatus 20. Even if a communication apparatus 20 transmits a signal in a range indicated in the drawing at the center of FIG. 9, the receiving communication apparatus 20 may receive a signal in a frequency range that has slightly shifted as illustrated in the drawing at the right-hand side of FIG. 9. In a case where the communication apparatus 20 corrects this shift, for example, it may be considered to correct the shift by using a DMRS. In this case, in the drawing at the right-hand side of FIG. 9, if all the signals included in the frequency band are DMRSs, the details of signals transmitted as DMRSs are known in advance by the receiving communication apparatus 20, and, thus, interference received by a signal in an RE from a signal in an adjacent RE can be accurately estimated. In this case, after detecting the interference received by the signal in the RE from the adjacent RE, the offset of the carrier frequency can be corrected. In contrast, when a signal adjacent to a DMRS is a data signal, the details of the data signal are not known in advance by the receiving communication apparatus 20. Accordingly, the interference received by the signal in the RE from the signal in the adjacent RE may be unable to be accurately estimated. Namely, the offset of the carrier frequency may be unable to be accurately corrected.

Figure 10:
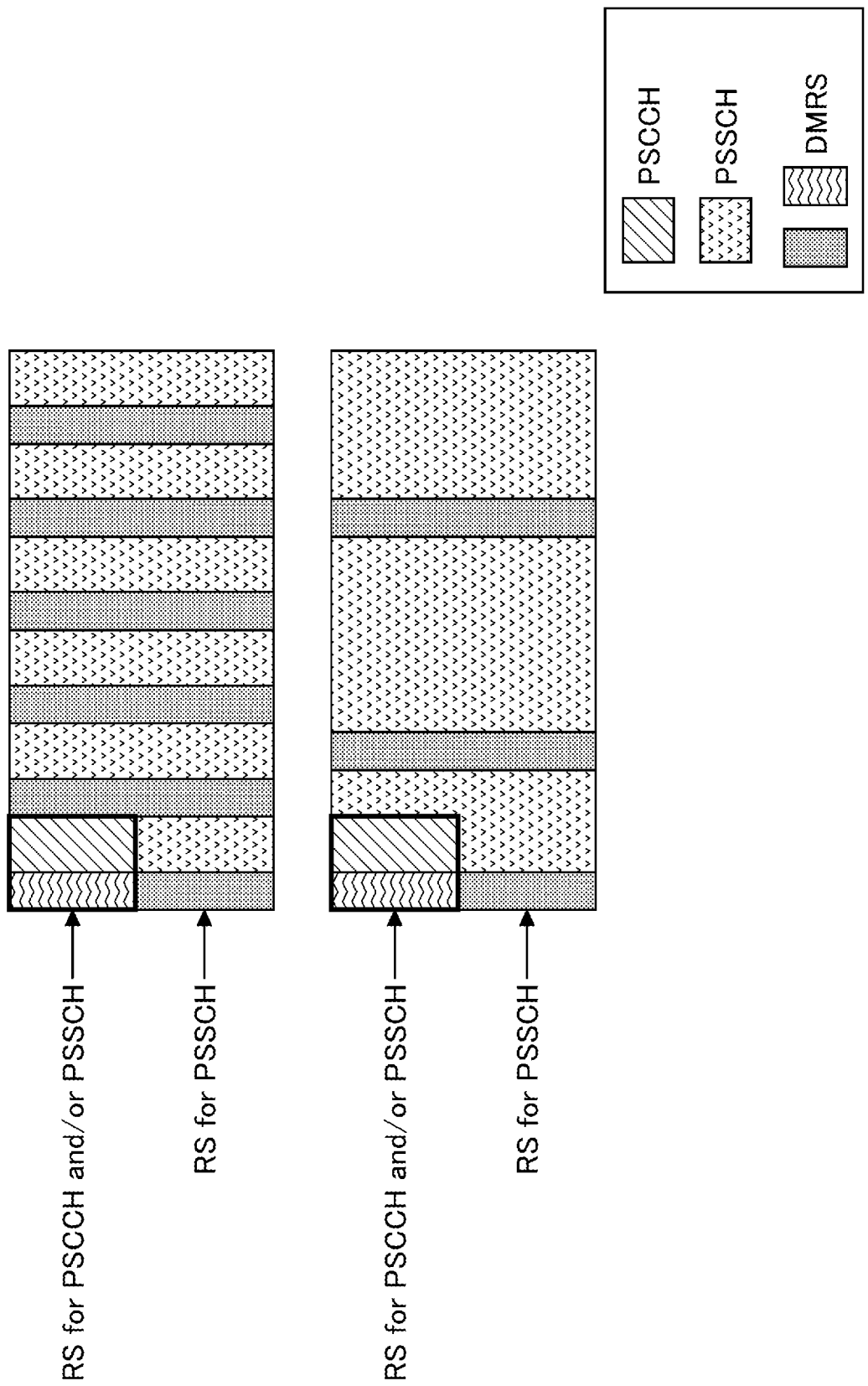
FIG. 10 is a diagram illustrating an example of allocating DMRS for PSSCH and DMRS for PSCCH in the same symbol.
Figure 11:
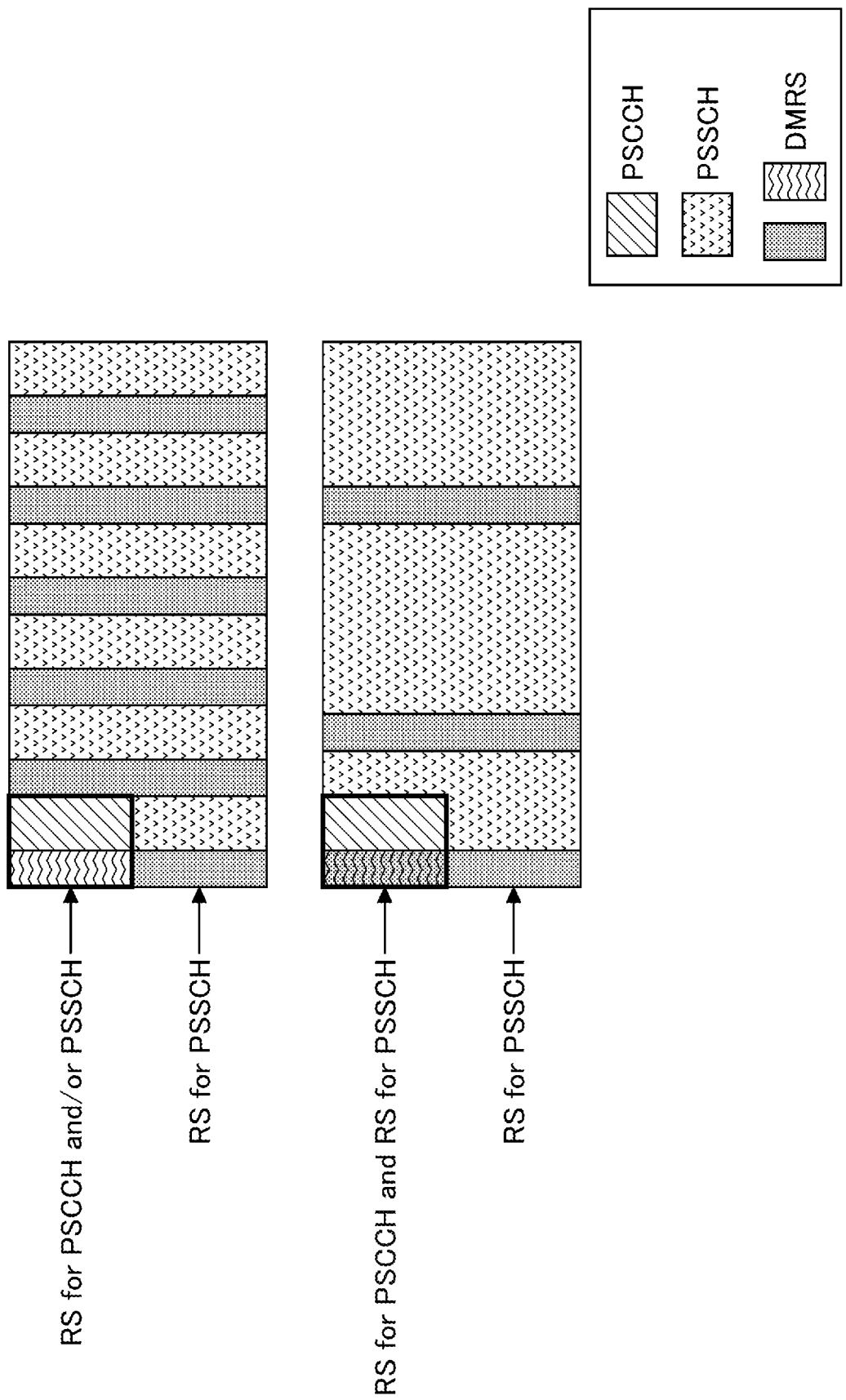
FIG. 11 is a diagram illustrating another example of allocating DMRS for PSSCH and DMRS for PSCCH in the same symbol.

(Solution 1) Solution 1 is a method for causing the configuration and mapping of a DMRS for a PSCCH and a DMRS for a PSSCH to be the same in a portion where the PSCCH and the PSSCH overlap each other. In other words, Solution 1 is a method in which the DMRS is shared by the PSCCH and the PSSCH. For example, as illustrated in FIG. 10 and FIG. 11, Solution 1 is an idea in which the DMRS for the PSSCH and the DMRS for the PSCCH are allocated in the same symbol, and these DMRSs are made available to both of the PSCCH and the PSCCH.

(DMRS for PSCCH)

A DMRS for a PSCCH is mapped onto all the resource elements of one or more symbols. The DMRS and sidelink control information (SCI) are time-division-multiplexed.

Method A-0a: The location of the DMRS for the PSCCH is the same as that of the case where a PSCCH and a PSSCH do not overlap each other in the time domain. Namely, the location of the DMRS for each slot is configured in advance irrespective of channel mapping.

Method A-0b: in a case where a PSCCH overlaps a PSSCH, the location of the DMRS for the PSCCH is in accordance with a (pre)configured location of the DMRS for the PSSCH.

(DMRS for PSSCH) Method A-1: in a case where, in all or a part of a PSCCH and/or a PSSCH, the PSCCH and the PSSCH are frequency-division multiplexed, the location, the symbol, and/or a sequence of the DMRS for the PSSCH are the same as, in at least overlapping symbol, the location, the symbol, and/or the sequence of the DMRS for the PSCCH. Namely, the DMRS for the PSCCH can be used as the DMRS for the PSSCH. The DMRS for the PSSCH may be mapped onto a non-overlapping portion.

Method A-1-1: If a DMRS for a PSSCH is not mapped onto an overlapping portion of a PSSCH, the DMRS for the PSSCH may be additionally mapped onto the symbol that is the same as that of the DMRS for the PSCCH. A dedicated sequence can be used for the DMRS for the PSCCH (FIG. 10).

Method A-1-2: A DMRS for a PSSCH may be additionally mapped onto a symbol that is the same as the symbol of a DMRS for a PSCCH. Namely, two DMRSs are mapped onto the same RE. A single and/or dedicated sequence can be used for overlapping symbol and non-overlapping symbol (FIG. 11).

Figure 12:
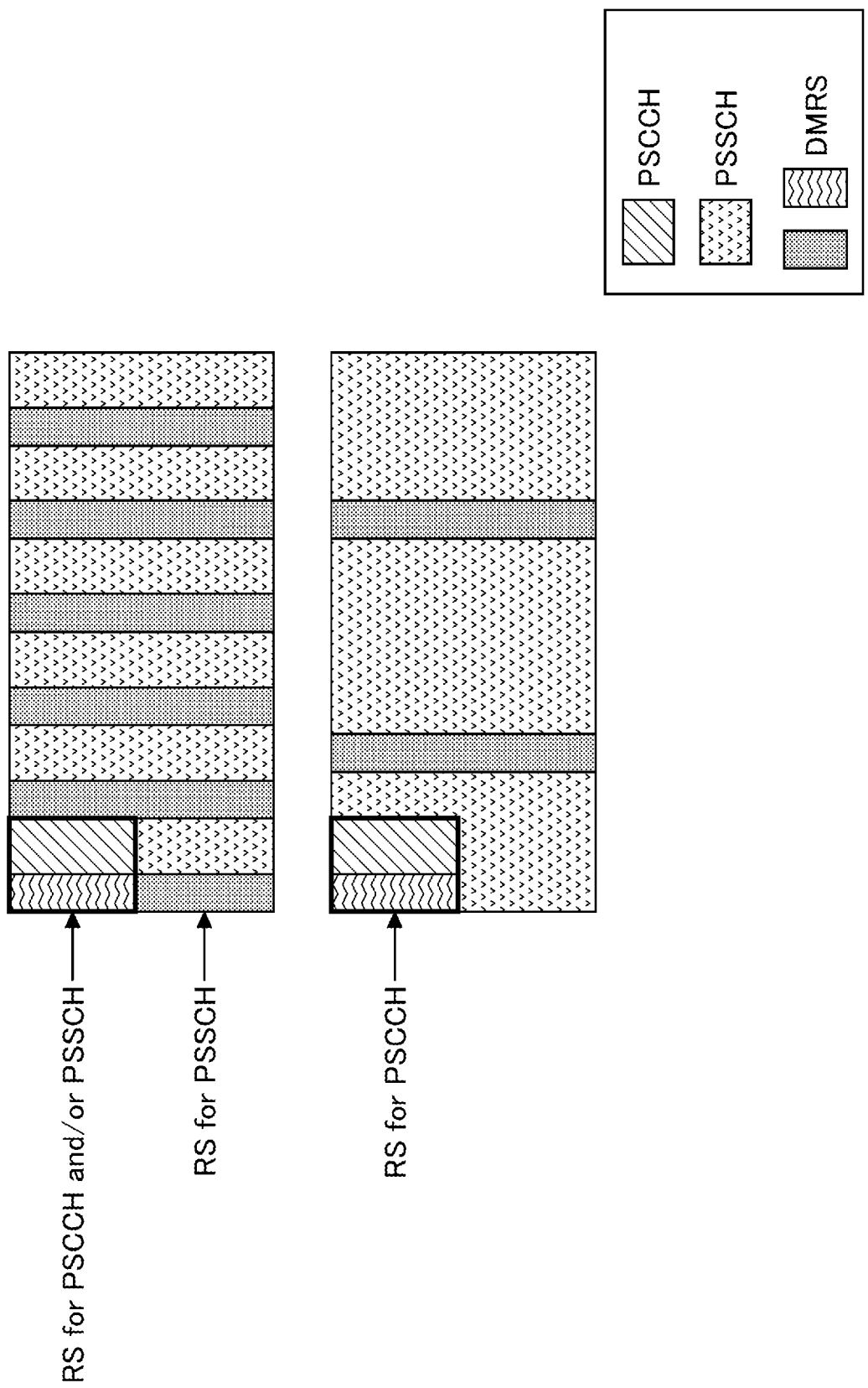
FIG. 12 is a diagram illustrating an example in which, when the number of DMRSs is not so large, DMRS for PSSCH and DMRS for PSCCH are not allocated in the same symbol.

Method A-2: If DMRSs for a PSCCH and a PSSCH do not overlap each other, a DMRS for a PSSCH need not be allocated separately. Namely, only if there are many DMRSs, and DMRSs for PSCCH and PSSCH overlap each other, DMRSs may be configured to be shared by the PSSCH and the PSCCH. In other words, if the PSCCH and the PSSCH are frequency-division multiplexed in all and/or a part of the PSCCH and/or the PSSCH, and a DMRS is mapped onto an overlapping portion of the PSSCH, the DMRS symbol and/or the sequence for the PSSCH are the same as, in at least the overlapping symbol, the DMRS symbol and/or the sequence for the PSCCH (FIG. 12).

Advantageous Effects

With regard to Problem A, even if PSSCH includes many DMRSs in the time domain, and a part of the DMRS overlaps PSCCH, the pattern of the DMRS for the PSSCH can be the same as the pattern of the DMRS for the PSSCH for a case where the DMRS for the PSSCH and the DMRS for the PSCCH do not overlap each other. With regard to Problem B, a DMRS and a control signal are time-division multiplexed instead of being frequency-division multiplexed, and, thus, an offset (CFO) of the carrier frequency can be corrected with a higher accuracy.

(Solution 2)

In Solution 2, a DMRS for a PSSCH and a PSCCH are time-division multiplexed. Namely, the DMRS for the PSSCH does not overlap the PSCCH in the time domain.

(DMRS for PSCCH)

Method B-1: A DMRS for a PSCCH is frequency-division multiplexed with side link control information (SCI) (FIG. 13). With regard to estimation and/or correction of a carrier frequency offset (CFO), all and/or a part of REs adjacent to the DMRS need not transmit a signal. Namely, any information or reference signal need not be mapped onto all and/or a part of REs adjacent to the DMRS. For example, a carrier frequency offset (CFO) can be estimated and corrected by using the DMRS for the PSCCH between the two REs indicated as "empty" in FIG. 13.

Method B-2: A DMRS for a PSCCH and side link control information (SFI) are time-division multiplexed.

(DMRS for PSSCH)

Method B-3: The communication apparatus 20 does not expect that a DMRS for a PSSCH is transmitted and/or received in a symbol overlapping the PSCCH. In this manner, it may be specified in a technical specification document that a DMRS for a PSSCH is not transmitted and/or received in a symbol overlapping the PSCCH.

Method B-4: For a symbol overlapping a PSCCH, if a DMRS is to be mapped onto the PSSCH, the communication apparatus 20 may map sidelink data onto the symbol, without mapping the DMRS for the PSSCH onto the symbol (FIG. 14). In this case, the communication apparatus 20 may defer the mapping of the DMRS for the PSSCH until a symbol not overlapping the PSCCH in the time domain.

Advantageous Effects

With regard to Problem A, a DMRS for a PSCCH and a PSCCH are time-division multiplexed, and, thus, it is not necessary to consider overlapping portion. With regard to Problem B, according to Method B-2, a DMRS and a control signal are time-division multiplexed instead of being frequency-division multiplexed, and, thus, a carrier frequency offset (CFO) can be corrected with a higher accuracy. According to Method B-1, a carrier frequency offset (CFO) can be estimated and corrected with a higher accuracy by using a DMRS for a PSCCH located between the two REs indicated as "empty" in FIG. 13.

(Solution 3)

In Solution 3, a DMRS for a PSSCH and a PSCCH are frequency-division multiplexed.

(DMRS for PSCCH)

Method B-1 or Method B-2 can be applied to a DMRS for a PSCCH.

(DMRS for PSSCH)

Method C-1: A DMRS for a PSSCH can be the same as that of the case where a PSCCH and the PSSCH do not overlap each other in the time domain. In this case, the DMRS for the PSSCH may be punctured by the PSCCH. Namely, the sequence of the DMRS for the PSSCH can be the same as the sequence for the case where the PSCCH and the PSSCH do not overlap in the time domain.

Method C-2: In at least a portion overlapping a PSCCH, a mapping of a DMRS for a PSSCH may be the same as the mapping of the DMRS in the overlapping portion of the PSCCH. Namely, when a DMRS for a PSSCH and side link control information are to be frequency-division multiplexed in a PSCCH, the DMRS and sidelink data are frequency-division multiplexed.

Advantageous Effects

With regard to Problem A, a method of channel estimation in a PSCCH can be applied to an overlapping portion. A method of channel estimation in a PSSCH can be applied to a non-overlapping portion. With regard to Problem B, according to Method B-2, a DMRS and a control signal are time-division multiplexed instead of being frequency-division multiplexed, and, thus, a carrier frequency offset (CFO) can be corrected with a higher accuracy. According to Method B-1, a carrier frequency offset (CFO) can be estimated and corrected with a higher accuracy by using a DMRS for a PSCCH between two REs indicated as "empty" in FIG. 13.

(Device Configuration)

Next, a functional configuration example of each of the base station 10 and the communication apparatus 20 that execute the processes and the operation described so far is described.

<Base Station 10>

Figure 15:
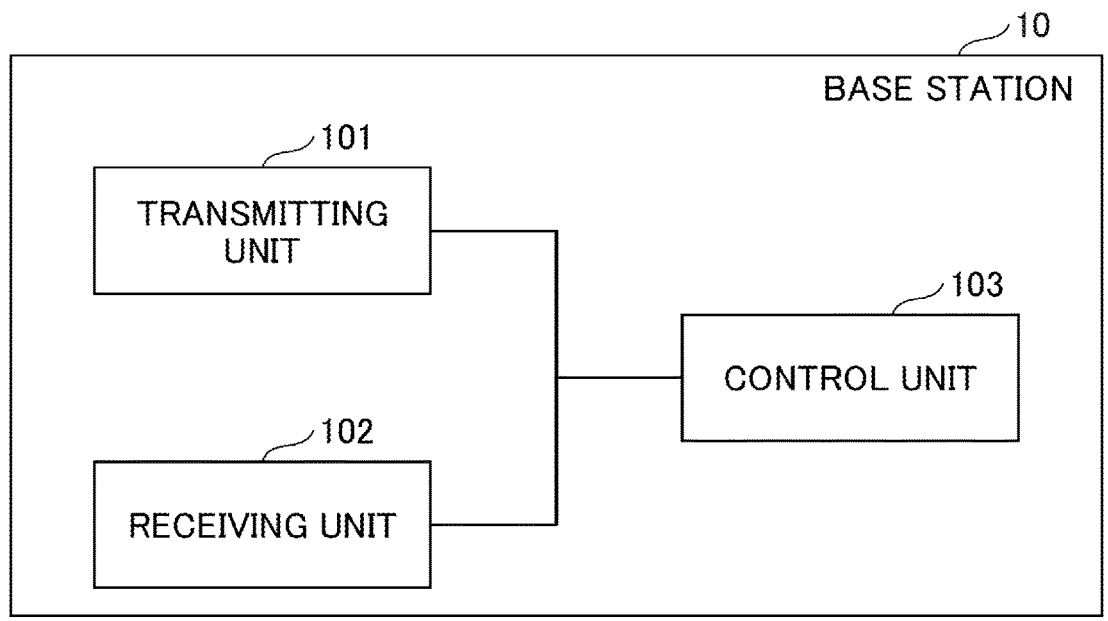
FIG. 15 is a diagram illustrating an example of a functional configuration of a base station according to an embodiment.

FIG. 15 is a diagram illustrating an example of a functional configuration of the base station 10. As illustrated in FIG. 15, the base station 10 includes a transmitting unit 101, a receiving unit 102, and a control unit 103. The functional configuration illustrated in FIG. 15 is only an example. As long as the operation according to the embodiments can be executed, the functional division and the name of the functional unit may be any division and name. Furthermore, the transmitting unit 101 may be referred to as a transmitter, and the receiving unit 102 may be referred to as a receiver.

The transmitting unit 101 has a function of generating a signal to be transmitted to the communication apparatus 20 side and transmitting the signal wirelessly. The receiving unit 102 has a function of receiving various types signals transmitted from the communication apparatus 20 and acquiring, for example, information of an upper layer from the received signals. Furthermore, the receiving unit 102 has a function of measuring the received signal and acquiring a quality value.

The control unit 103 controls the base station 10. The function of the control unit 103 related to transmission may be included in the transmitting unit 101, and the function of the control unit 103 related to reception may be included in the receiving unit 102.

<Communication Apparatus 20>

Figure 16:
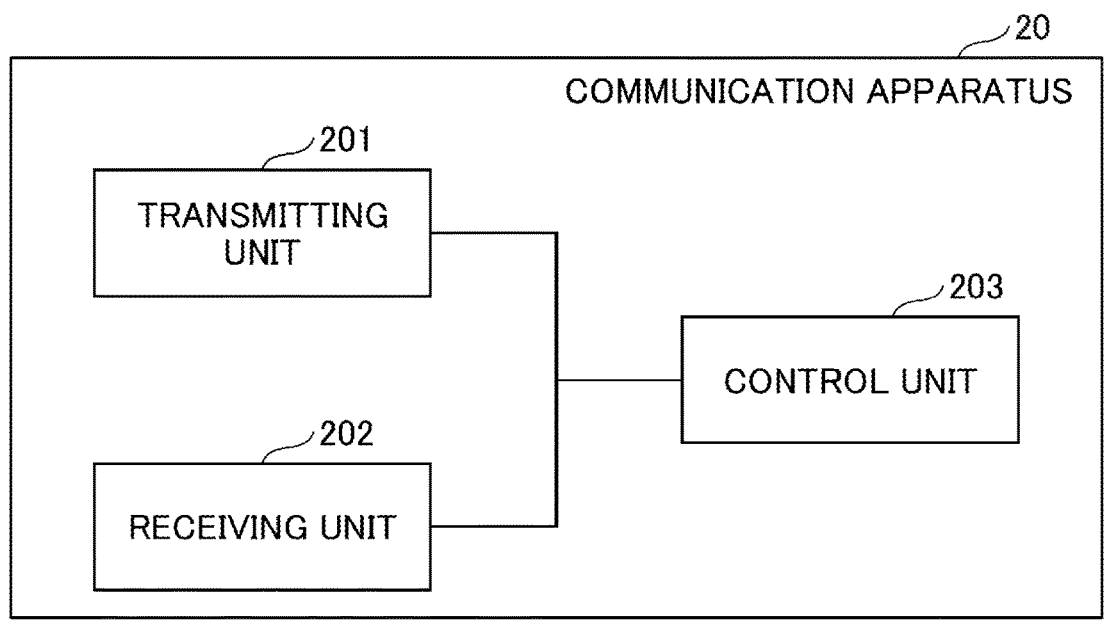
FIG. 16 is a diagram illustrating an example of a functional configuration of a communication apparatus according to an embodiment.

FIG. 16 is a diagram illustrating an example of a functional configuration of the communication apparatus 20. As illustrated in FIG. 16, the communication apparatus 20 includes a transmitting unit 201, a receiving unit 202, and a control unit 203. The functional configuration illustrated in FIG. 16 is only an example. As long as the operation according to the embodiments can be executed, the functional division and the name of the functional unit nay be any division and name. Furthermore, the transmitting unit 201 may be referred to as a transmitter, and the receiving unit 202 may be referred to as a receiver. Furthermore, the communication apparatus 20 may be the communication apparatus 20A on the transmission side or the communication apparatus 20B on the reception side.

The control unit 203 allocates DMRS for PSSCH and DMRS for PSCCH at the same symbol, so that these DMRSs can be used for both the PSSCH and the PSCCH. The control unit 203 maps DMRS for PSCCH onto all the resource elements of one or more symbols. The control unit 203 time-division multiplexes DMRS with control information (SCI: Sidelink Control Information). The transmitting unit 201 transmits DMRS for PSSCH and DMRS for PSCCH allocated at the same symbol. In this case, a receiving unit of the receiving communication apparatus 20 receives the DMRS for the PSSCH and the DMRS for the PSCCH allocated at the same symbol, and the control unit 203 uses the DMRS for the PSSCH for demodulating the PSSCH and uses the DMRS for PSCCH for demodulating the PSCCH.

Furthermore, in the transmitting communication apparatus 20, the control unit 203 may time-division multiplex DMRS for PSCCH with sidelink control information (SCI). In this case, the control unit 203 may mute some resource elements (REs) adjacent to the DMRS, and the transmitting unit 201 may transmit the DMRS for the PSCCH and the sidelink control information that are time-division multiplexed. In the receiving communication apparatus 20, the receiving unit 202 receives DMRS for PSCCH and sidelink control information that are dime-division-multiplexed. In this case, the control unit 203 of the receiving communication apparatus 20 may estimate and correct a carrier frequency offset (CFO), for example, by using the DMRS for the PSCCH located between to REs that are muted.

Furthermore, in the transmitting communication apparatus 20, the control unit 203 may frequency-division-multiplex DMRS for PSSCH with PSCCH. In this case, the control unit 203 may frequency-division-multiplex DMRS for PSCCH with sidelink control information. Alternatively, the control unit 203 may map sidelink data onto a symbol that overlaps with PSCCH, without mapping DMRS for PSSCH onto the symbol. Furthermore, the control unit 203 may set DMRS for PSSCH similar to a case in which PSCCH and PSSCH does not overlap with each other in the time domain. Furthermore, when DMRS for PSSCH and sidelink control information are frequency-division-multiplexed in PSSCH, the control unit 203 may frequency-division-multiplex DMRS for PSSCH with sidelink data.

<Hardware Configuration>

The block diagrams (FIG. 15 and FIG. 16) used for the description of the above embodiments illustrate blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices. Functions include, but are not limited to, judgement, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 17:
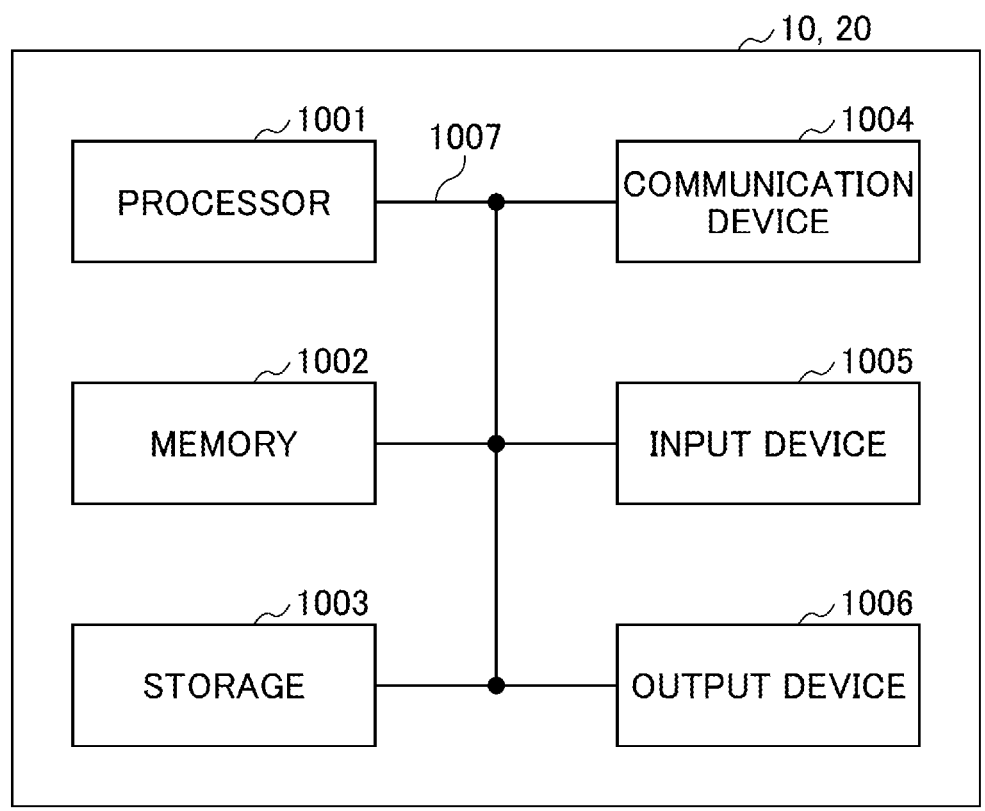
FIG. 17 is a diagram illustrating an example of a hardware configuration of the base station and the communication apparatus according to an embodiment.

For example, the communication apparatus 20 and the base station 10 in an embodiment of the present invention may function as a computer for performing a process of the embodiments. FIG. 17 is a diagram illustrating an example of a hardware configuration of the communication apparatus 20 and the base station 10 according to an embodiment. Each of the communication apparatus 20 and the base station 10 described above may be physically configured as a computer device including a processor 1001, a memory 1002, a storage 1003, a communication device 1004, an input device 1005, an output device 1006, a bus 1007, and the like.

In the following description, the term "device" can be replaced with a circuit, device, unit, or the like. The hardware configuration of each of the communication apparatus 20 and the base station 10 may be configured to include one or more of devices represented by 1001 through 1006, which are depicted, or may be configured without including some devices.

Each function in each of the communication apparatus 20 and the base station 10 is implemented such that predetermined software (program) is read on hardware such as the processor 1001, the memory 1002 and the like, and the processor 1001 performs an operation and controls communication by the communication apparatus 1004 and at least one of reading and writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like.

Furthermore, the processor 1001 reads a program (program code), a software module, data, or the like from at least one of the storage 1003 and the communication apparatus 1004 out to the memory 1002, and executes various types of processes according to them. A program causing a computer to execute at least some of the operations described in the above embodiments is used as the program. For example, the control unit 203 of the communication apparatus 20 may be implemented by a control program which is stored in the memory 1002 and operates on the processor 1001, and another functional block may be implemented similarly. Various types of processes are described to be executed by one processor 1001 but may be executed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 may also be referred to as a "register," a "cache," a "main memory," or the like. The memory 1002 can store programs (program codes), software modules, or the like which are executable for carrying out the radio communication method according to an embodiment of the present disclosure.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 may be referred to as an auxiliary storage device. The above-described storage medium may be, for example, a database, a server, or any other appropriate medium including at least one of the memory 1002 and the storage 1003.

The communication apparatus 1004 is hardware (a transmitting and receiving device) for performing communication between computers via at least one of a wired network and a wireless network and is also referred to as a "network device," a "network controller," a "network card," a "communication module," or the like. The communication apparatus 1004 may be configured to include a high frequency switch, a duplexer, a filter, a frequency synthesizer, and the like to implement at least one of frequency division duplex (FDD) and time division duplex (TDD).

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The devices such as the processor 1001 and the memory 1002 are connected by the bus 1007 to communicate information with each other. The bus 1007 may be configured with a single bus or may be configured with different buses between the devices.

Furthermore, each of the communication apparatus 20 and the base station 10 may be configured to include hardware such as a microprocessor, a digital signal processor (DSP: Digital Signal Processor), an application specific integrated circuit (ASIC), a programmable logic device (PLD), or a field programmable gate array (FPGA), or all or some of the functional blocks may be implemented by the hardware. For example, the processor 1001 may be implemented by at least one of these hardware components.

Conclusion of the Embodiments

In this specification, at least a communication apparatus and a communication method described below are disclosed.

A communication apparatus including a control unit configured to, when a sidelink control channel and a sidelink shared channel are to be frequency-division multiplexed, map a demodulation reference signal for the sidelink shared channel onto a symbol onto which a demodulation reference signal for the sidelink control channel is mapped; and a transmitting unit configured to transmit the symbol onto which the demodulation reference signal for the sidelink control channel and the demodulation reference signal for the sidelink shared channel are mapped.

According to the above-described configuration, even if PSSCH includes many DMRSs in the time domain, and a part of a DMRS overlaps a PSCCH, a DMRS pattern for the PSSCH can be made the same as a DMRS pattern for the PSSCH for a case where a DMRS for a PSSCH and a DMRS for a PSCCH do not overlap each other. Furthermore, a DMRS and a control signal are time-division multiplexed instead of being frequency-division multiplexed, and, thus, a carrier frequency offset (CFO) can be corrected with a higher accuracy.

The control unit may use, as a sequence of the demodulation reference signal for the sidelink shared channel, a sequence that is same as a sequence of the demodulation reference signal for the sidelink control channel.

Upon detecting that the demodulation reference signal for the sidelink control channel does not overlap the sidelink shared channel in a time domain, the control unit may avoid mapping the demodulation reference signal for the sidelink shared channel onto the symbol onto which the demodulation reference signal for the sidelink control channel is mapped.

When the control unit avoids mapping the demodulation reference signal for the sidelink shared channel onto the symbol onto which the demodulation reference signal for the sidelink control channel is mapped, the control unit may frequency-division multiplex the demodulation reference signal for the sidelink control channel and sidelink control information on the sidelink control channel, and may mute a resource element adjacent to a specific resource element onto which the demodulation reference signal for the sidelink control channel is mapped. According to this configuration, the receiving communication apparatus can estimate and correct a carrier frequency offset with a higher accuracy by using a DMRS for a PSCCH mapped onto a resource adjacent to a resource that is muted.

A communication method by a communication apparatus, the method including, when a sidelink control channel and a sidelink shared channel are to be frequency-division multiplexed, mapping a demodulation reference signal for the sidelink shared channel onto a symbol onto which a demodulation reference signal for the sidelink control channel is mapped; and transmitting the symbol onto which the demodulation reference signal for the sidelink control channel and the demodulation reference signal for the sidelink shared channel are mapped.

According to the above-described configuration, even if PSSCH includes many DMRSs in the time domain, and a part of a DMRS overlaps a PSCCH, a DMRS pattern for the PSSCH can be made the same as a DMRS pattern for the PSSCH for a case where a DMRS for a PSSCH and a DMRS for a PSCCH do not overlap each other. Furthermore, a DMRS and a control signal are time-division multiplexed instead of being frequency-division multiplexed, and, thus, a carrier frequency offset (CFO) can be corrected with a higher accuracy.

Supplemental Embodiment

The embodiments of the present invention are described above, but the disclosed invention is not limited to the above-described embodiments, and those skilled in the art would understand various modified examples, revised examples, alternative examples, substitution examples, and the like. In order to facilitate understanding of the invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the communication apparatus 20 and the base station 10 are described using the functional block diagrams, but such devices may be implemented by hardware, software, or a combination thereof. Software executed by the processor included in the communication apparatus 20 according to the embodiments of the present invention and software executed by the processor included in the base station 10 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspects or embodiments described in the present disclosure and may be provided by any other method. For example, the notification of information may be provided by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present disclosure may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), new Radio (NR), W-CDMA (registered trademark), GSM (registered trademark), CDMA 2000, Ultra Mobile Broadband (UMB), IEEE 802.11 (Wi-Fi(registered trademark)), IEEE 802.16 (WiMAX(registered trademark)), IEEE 802.20, Ultra-WideBand (UWB), Bluetooth (registered trademark), a system using any other appropriate system, and next generation systems extended based on these standards. Furthermore, a plurality of systems (e.g., a combination of at least one of LTE and LTE-A with 5G) may be combined to be applied.

The processing procedures, the sequences, the flowcharts, and the like of the respective aspects/embodiments described in the present disclosure may be reversed in order provided that there is no contradiction. For example, the method described in the present disclosure presents elements of various steps with an exemplary order and is not limited to a presented specific order.

In the present disclosure, a specific operation to be performed by the base station 10 may be performed by an upper node in some cases. In the network including one or more network nodes including the base station 10, various operations performed for communication with the terminal can be obviously performed by at least one of the base station 10 and any network node (for example, an MME, an S-GW, or the like is considered, but it is not limited thereto) other than the base station 10. A case is exemplified above in which there is one network node other than the base station 10. The one network node may be a combination of a plurality of other network nodes (e.g., MME and S-GW).

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination may be performed in accordance with a value (0 or 1) indicated by one bit, may be performed in accordance with a Boolean value (Boolean: true or false), or may be performed by a comparison of numerical values (for example, a comparison with a predetermined value).

Each aspect/embodiment described in the present disclosure may be used alone, in combination, or may be switched in accordance with the execution. Further, notification of predetermined information (for example, notification of "being X") is not limited to being performed explicitly, but may be performed implicitly (for example, not notifying the predetermined information).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Furthermore, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL: Digital Subscriber Line)) and a radio technology (such as infrared rays or a microwave), at least one of the wired technology and the radio technology are included in a definition of a transmission medium.

Information, signals, and the like described in this disclosure may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or any combination thereof.

The terms described in the present disclosure and terms necessary for understanding the present disclosure may be replaced with terms having the same or similar meanings. For example, at least one of a channel and a symbol may be a signal. Further, a signal may be a message.

The terms "system" and "network" used in the present disclosure are used interchangeably. Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names assigned to the various channels and the information elements are not limited in any respect.

In the present disclosure, the terms "base station (BS: Base Station)," "radio base station," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication apparatus, a remote device, a mobile subscriber station, an access terminal, a mobile terminal, a wireless terminal, a remote terminal, a handset, a user agent, a mobile client, a client, or some other suitable terms.

At least one of the base station and the mobile station may be also referred to as a transmitting device, a receiving device, a communication apparatus, or the like. At least one of the base station and the mobile station may be a device installed in a mobile body, a mobile body itself, or the like. The mobile body may be a vehicle (for example, a car, an airplane, or the like), an unmanned body that moves (for example, a drone, an autonomous car or the like), or a robot (manned type or unmanned type). At least one of the base station and the mobile station includes a device which need not move during a communication operation. For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the user terminal is replaced with communication between a plurality of terminals (for example, which may be referred to as device-to-device (D2D) or vehicle-to-everything (V2X)). In this case, the user terminal 20 may have the functions of the base station 10 described above. Further, the terms "uplink" and "downlink" may be replaced with terms (for example, "side") corresponding to inter-terminal communication. For example, an uplink channel, a downlink channel, or the like may be replaced with side channels.

Similarly, the user terminal in the present disclosure may be replaced with the base station. In this case, the base station 10 may have the functions of the above-mentioned user terminal 20.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based only on" unless otherwise stated. In other words, a phrase "based on" means both "based only on" and "based on at least."

In a case in which "include," "including," and variations thereof are used in the present disclosure, these terms are intended to be comprehensive, similar to a term "provided with (comprising)." Further, the term "or" used in the present disclosure is intended not to be an exclusive OR.

In the present disclosure, for example, when an article such as "a," "an," or "the" in English is added by a translation, the present disclosure may include a case in which a noun following the article is the plural.

In the present disclosure, a term "A and B are different" may mean "A and B are different from each other." Furthermore, the term may mean "each of A and B is different from C." Terms such as "separated," "coupled," or the like may also be interpreted in similarly to "different."

Although the present invention is described above in detail, it is obvious to those skilled in the art that the present invention is not limited to the embodiments described in the specification. The present invention may be implemented as revised and modified embodiments without departing from the gist and scope of the present invention as set forth in claims. Accordingly, the description of the specification is for the purpose of illustration and does not have any restrictive meaning to the present invention.

LIST OF REFERENCE SYMBOLS

10 base station
20 communication apparatus
101 transmitting unit
102 receiving unit
103 control unit
201 transmitting unit
202 receiving unit
203 control unit
1001 processor
1002 memory
1003 storage
1004 communication device
1005 input device
1006 output device

The invention claimed is:

1. A terminal comprising:
a processor that executes time division multiplexing or frequency division multiplexing of a first demodulation reference signal for a sidelink shared channel and a sidelink control channel, or that executes both the time division multiplexing and the frequency division multiplexing; and
a transmitter that transmits the sidelink control channel and the sidelink shared channel,
wherein the processor frequency division multiplexes control information of the sidelink control channel and a second demodulation reference signal for the sidelink control channel in one symbol, and the processor maps the first demodulation reference signal onto the one symbol,
wherein the one symbol is a symbol included in a sidelink control information resource pool,
wherein configuration information of the sidelink control information resource pool is indicated by a System Information Block (SIB), and
wherein the processor sets, in the one symbol, power of the sidelink control channel and power of the second demodulation reference signal for the sidelink control channel to a same value.

2. The terminal according to claim 1, wherein the processor frequency division multiplexes the sidelink control channel and a portion of the sidelink shared channel, and the processor time division multiplexes the sidelink control channel and the other portion of the sidelink shared channel.

3. A communication system comprising:
- a first terminal including:
  - a processor that executes time division multiplexing or frequency division multiplexing of a first demodulation reference signal for a sidelink shared channel and a sidelink control channel, or that executes both the time division multiplexing and the frequency division multiplexing, and
  - a transmitter that transmits the sidelink control channel and the sidelink shared channel,
  - wherein the processor frequency division multiplexes control information of the sidelink control channel and a second demodulation reference signal for the sidelink control channel in one symbol, and the processor maps the first demodulation reference signal onto the one symbol,
  - wherein the one symbol is a symbol included in a sidelink control information resource pool,
  - wherein configuration information of the sidelink control information resource pool is indicated by a System Information Block (SIB), and
  - wherein the processor sets, in the one symbol, power of the sidelink control channel and power of the second demodulation reference signal for the sidelink control channel to a same value; and
- a second terminal including a receiver that receives the sidelink control channel and the sidelink shared channel.

4. A communication method executed by a terminal, the method comprising:
- executing time division multiplexing or frequency division multiplexing of a first demodulation reference signal for a sidelink shared channel and a sidelink control channel, or executing both the time division multiplexing and the frequency division multiplexing;
- transmitting the sidelink control channel and the sidelink shared channel;
- frequency division multiplexing control information of the sidelink control channel and a second demodulation reference signal for the sidelink control channel in one symbol, and mapping the first demodulation reference signal onto the one symbol,
- wherein the one symbol is a symbol included in a sidelink control information resource pool,
- wherein configuration information of the sidelink control information resource pool is indicated by a System Information Block (SIB), and
- wherein the terminal sets, in the one symbol, power of the sidelink control channel and power of the second demodulation reference signal for the sidelink control channel to a same value.

* * * * *